AMPLITUDE AND FREQUENCY DISCRIMINATORY GATING CIRCUIT

Filed Sept. 22, 1949

INVENTOR
Lucius P. Thomas, Jr.
BY [signature]
ATTORNEY

Patented Dec. 26, 1950

2,535,821

UNITED STATES PATENT OFFICE 2,535,821

AMPLITUDE AND FREQUENCY DISCRIMINATORY GATING CIRCUIT

Lucius P. Thomas, Jr., Collingswood, N. J., assignor to Radio Corporation of America, a corporation of Delaware Application September 22, 1949, Serial No. 117,190

14 Claims. (Cl. 178—7.3)

Figure 1:
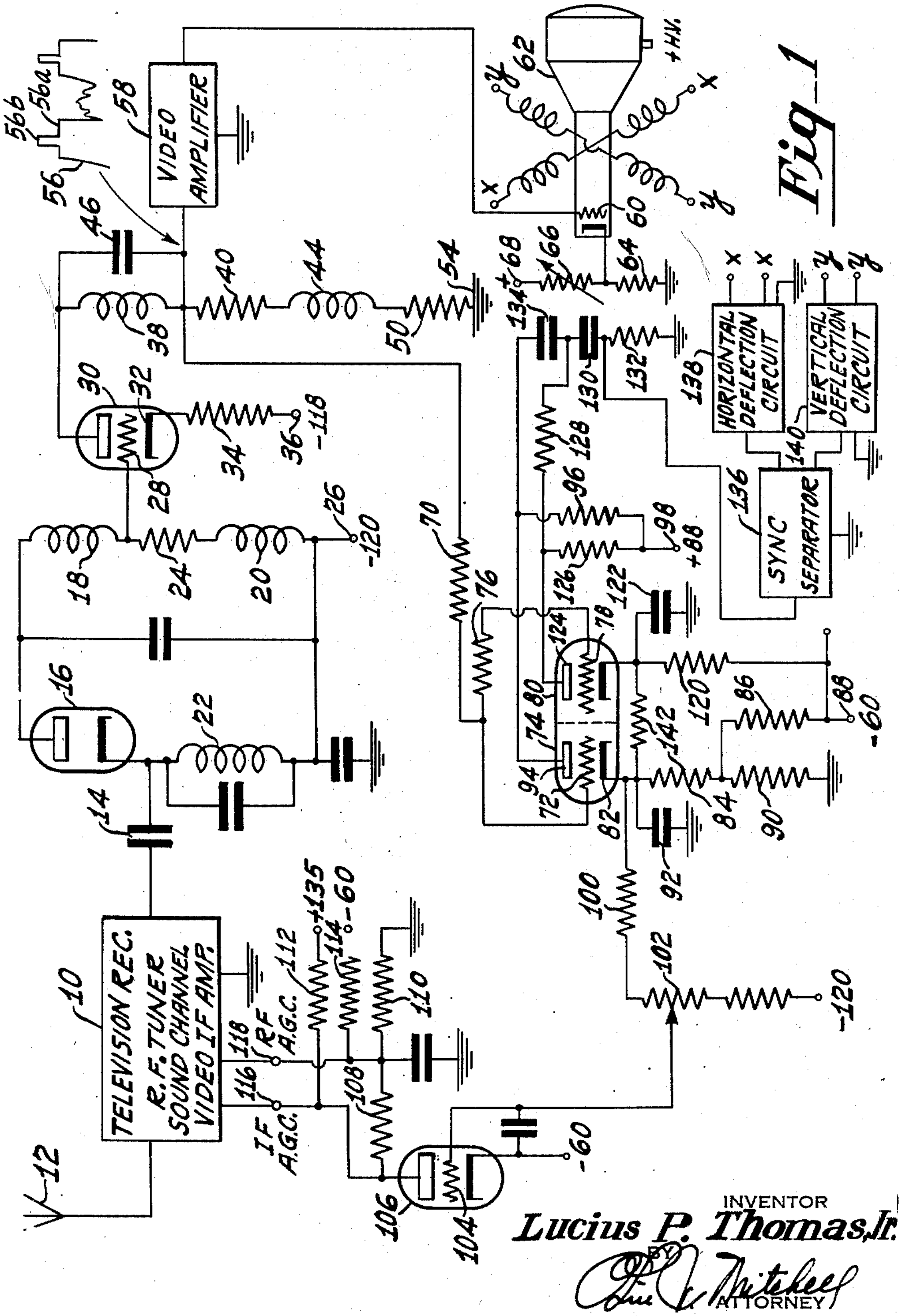

The present invention relates to electrical gating circuits or signal clippers for use in communication circuits and more particularly, but not necessarily exclusively, to novel apparatus in a television receiver for obtaining improved clipping and pre-separation of sync signals combined with improved means for controlling the gain of one or more of the television receiver signal amplifiers.

In communications equipment, it is oftentimes desirable to provide means for separating out a predetermined portion of an applied signal, the predetermined portion being defined between certain amplitude levels of the overall signal. Particularly in the case of television receiving circuits is such circuit operation required, inasmuch as it is necessary to process the received composite signal in such a way as to remove the horizontal and vertical line synchronizing pulses therefrom and isolate these synchronizing pulses from the image information for application to separate signal channels within the receiver.

In order to effect the extraction of synchronizing signal information from the composite television signal, it is common practice to apply the composite video signal as demodulated by the receiver to an amplitude discriminatory circuit usually termed a gate or clipping circuit. Since the vertical and horizontal synchronizing pulses actually rest upon a signal level usually referred to as the image black or blanking level, these sync clipping circuits are generally adjusted to refuse passage to all signals below this television signal black level. The output of the clipping circuit will then contain substantially nothing but horizontal and vertical synchronizing pulses which, through the use of well-known integrating and differentiating circuits, may be separated from one another for respective application to the horizontal and vertical deflection circuits of the television receiver.

The main problem involved in such signal clipping circuits is to establish some means of varying threshold for the signal clipper or gate circuit so that as the incoming signal varies in amplitude, the actual information passed by the clipper stage will remain the same in character. The use of an automatic gain control in the receiver will of course simplify to a great extent this problem since the amplitude of the signal applied to the gate circuit can, within limits, be held substantially constant. However, an automatic gain control circuit having sufficient range to permit the use of a fixed threshold signal clipper in television receivers would be extremely costly and therefore not practical from a commercial standpoint. On the other hand, well-known sync clipping circuits, which develop their own threshold bias from energy extracted from the applied composite signal, are usually quite vulnerable to extraneous signal noise and rapid signal fading. The problem of noise immunity and signal fading is made more difficult in television sync clipping circuits where there exists such a wide difference in the recurrence frequency of the two types of synchronizing pulses to be clipped.

It is therefore a purpose of the present invention to provide a new and improved signal gating circuit especially useful for parting higher and lower amplitude portions of an applied signal waveform.

It is further a purpose of the present invention to provide a new and improved sync separating circuit suitable for use in television receivers such that the effects of extraneous noise, as well as rapid signal fading on the character of the clipped synchronizing signal, are greately minimized.

It is moreover an object of the present invention to provide a combination sync clipping circuit, an automatic gain control circuit for use in television receivers.

A still further object of the present invention is to provide a novel television receiver type synchronizing signal clipper which provides separate clipping channels for both the horizontal and vertical synchronizing signals with means for immunizing the vertical sync clipping channel against rapid fluctuations in received signal as produced for instance by aircraft interference.

In the realization of the above aims, objects, and purposes, the present invention, in one of its broader aspects, contemplates the use of two signal clipping circuits, one designated for the clipping of higher frequency components of the signal involved while the other is designated for the clipping of the lower frequency components of the signal involved. The clipping threshold on each of the clipper circuits is then mainly governed in accordance with a control voltage developed across a time constant circuit associated with each clipping circuit, the time constant of each time constant circuit being comparable in magnitude to the respective periods of the low and high frequency components to be clipped. A signal fading correcting influence is then exercised over the low frequency signal clipper by partially governing the clipping level thereof by a version of the clipping level established by the higher frequency component signal clipper.

The present invention, in one of its more specific forms, as applied for instance to a television receiver, anticipates the use of a separate sync clipper discharge tube section for both the horizontal and vertical synchronizing signals, each discharge tube clipper section having its clipping threshold separately controllable. Separate time constant circuits having time constants comparable to the horizontal and vertical synchronizing pulses respectively and excited by clipped signal information are then applied for controlling the respective thresholds on the clipper sections. A signal fading correcting influence is then exerted over the vertical sync clipper section by applying an integrated version of the horizontal sync clipping section for partial control of the clipping threshold thereof. An automatic gain control potential may then be derived from the horizontal sync clipping section threshold potential.

A more complete understanding of the operation of the present invention, as well as other objects and features of advantage, will of course become apparent and immediately suggest themselves to those skilled in the art to which the invention is directed, from a reading of the following specification especially when taken in connection with the accompanying drawing in which:

Figure 1 is a combination schematic and block diagram of the present invention as applied to an otherwise conventional television receiving circuit.

Referring now to the single figure, there is illustrated in block form at 10 a section of a typical television receiver including the R. F. tuner, the sound channel and the video I. F. amplifier. Details of circuits suitable for application in the block 10, as well as other block representations to be used hereinafter, may be found in an article entitled "Television Receivers" by Antony Wright appearing in the RCA Review dated March 1947. Signals intercepted by the antenna 12 are then applied to the input of the R. F. tuner unit with the output of the video I. F. amplifier being coupled through capacitor 14 to the cathode circuit of a conventional diode demodulator circuit embracing diode 16. Suitable frequency correcting inductances 18, 20, and 22, with load resistor 24, are properly connected to form the load circuit for the diode 16. With the lower end of inductance 20 being connected to a negative biasing potential terminal 26, the upper end of resistor 24 may then be direct-current connected to the control electrode 28 of the first video amplifier 30. The cathode 32 of the video amplifier of course is properly connected through the cathode resistance 34 to a negative power supply terminal 36. The series combination of inductance 38, resistance 40 and inductance 44 along with the capacitor 46 constitute a conventional load circuit for connection between the anode of the video amplifier 30 and the ground potential terminal 48. Resistor 50 connected with the positive power supply terminal 54 is employed to adjust the actual bias on the video amplifier 58 and the later to be discussed threshold of the clipper triode 74.

With the connection shown, the output signal of the first video amplifier appearing at the juncture of the inductance 38 and resistance 40 will of course be in the sync positive direction as indicated by the waveform 56. This signal may be direct-current connected, as indicated, to the input of the next video amplifier 58 whose sync negative output is applied to the control electrode 60 of the image reproducing kinescope 62. A conventional form of brightness control is indicated as embracing the kinescope cathode resistance 64 and variable bleeder resistance 66, in turn connected with a positive power supply terminal 68.

In accordance with the present invention, the sync positive signal 56 appearing at the input of the video amplifier 58 is then applied through resistance 70 to the control electrode 72 of the horizontal sync clipper tube section 74. The resistance 70 tends to isolate the input capacity of the discharge tube section 74 from the output circuit of the video amplifier thereby increasing the permissible gain thereof. The signal thereby appearing at the control electrode 72 of the horizontal clipper tube section 74 is then applied through resistance 76 to the control electrode 78 of the vertical sync clipper tube section 80. The input capacitance of the control electrode 78 in conjunction with the series resistance 76 acts to integrate the applied signal thereby reducing the higher frequency component thereof.

The cathode 82 of the horizontal clipper tube section is then connected through resistance 84 and resistance 86 to a negative power supply terminal 88. The resistance 90 in combination with a resistance 86 acts as a voltage divider to properly adjust the potential of the cathode 82 relative to ground. Capacitor 92, in conjunction with the entire cathode resistance, forms a time constant circuit having a period several times that of the horizontal synchronizing signal period. With the anode 94 of the horizontal clipper tube section 74 connected through load resistance 96 to a source of positive potential 98 of proper magnitude, conduction in the tube section 74 will occur for only a portion of the horizontal sync intervals thereby providing clipped horizontal sync at the upper terminal of the load resistor 96. The time constant of the horizontal clipper cathode circuit being several times that of the horizontal sync pulse period will allow the cathode 82 of the horizontal clipper to maintain an average voltage substantially proportional to the black level 56*a* of the composite signal 56 in accordance with well-known cathode follower action. As indicated, this cathode potential may then be applied through resistor 100 and potentiometer 102 to the control 104 of D. C. amplifier 106 to produce an automatic gain control potential for the television receiver section 10. The voltage divider comprising resistors 108 and 110, as well as the resistances 112 and 114, respectively connected to suitable power supply potentials, provide proper AGC voltage ranges and polarities for application to the I. F. AGC terminal 116 and R. F. AGC terminal 118.

The vertical sync clipper tube section 80 has in its cathode circuit resistance 120 which connects the vertical sync clipper cathode 122 with the negative potential source terminal 88. Capacitor 122 in combination with the cathode resistance in the vertical tube section provides a time constant tailored to the vertical sync recurrence period so that with the connection of the vertical sync clipper anode 124 through load resistor 126 to power supply terminal 98, conduction in the vertical sync clipper is produced only by television sync components. Inasmuch as the integrating circuit embracing resistance 76 and the input capacitance of the vertical sync clipper 80 reduces the horizontal sync component applied to the clipper and the clip sync appearing at the upper end of the load resistor 126 is applied through another integrating network comprising resistance 128, capacitor 130, and resistance 132, The signal appearing at the upper end of the resistance 132 due to the vertical sync clipper is substantially restricted to that of the vertical sync pulse.

The horizontal synchronizing pulses then appearing at the upper end of the horizontal sync clipper tube section output resistance 96 are then coupled through capacitor 134 and the capacitor 130 to the resistor 132 which, of course, has vertical sync appearing thereacross. Thus, the input to the sync separator 136 is comprised substantially of only separated horizontal and vertical sync signals which are by conventional network methods separated and applied for the respective synchronization of the horizontal and vertical deflection circuits 138 and 140. The output of the horizontal and vertical deflection circuits are indicated for respective connection to the horizontal and vertical deflection yokes X—X and Y—Y.

In accordance with the above description, it will be seen that the actual clipping threshold for the respective gate circuits comprising the horizontal and vertical sync clippers is established by the time constant circuits in the respective clipper cathode circuits. For example, in the cathode circuit of the horizontal sync clipper section 74, the time constant of the capacitor 92 in conjunction with the combined shunt resistance of the elements 4, 86 and 90 being adjusted to be rather short, i. e., only several times the period of the horizontal line, the peak voltage appearing at the cathode will substantially equal the peak voltage corresponding to the top of sync 56b of waveform 56 for only a short duration. As soon as the capacitor 92 has charged to the peak of sync, and due to the operation potentials of the tube section 74, conduction therethrough will immediately cease and the capacitor 92 will begin to discharge through its effective shunt resistance. This will occur at a time subsequent to the horizontal sync pulse itself and the discharge will proceed at a rate such that at the time of occurrence of the next horizontal sync pulse the potential across the capacitor 92 will be such to permit conduction of the tube 72 for the values of input signal positively in excess of the black level 56a, thereby establishing the conditions for clipping of the horizontal sync. Thus, for all practical purposes the potential of the cathode 82 acts as a threshold control for conduction of the horizontal sync clipper tube section. Correspondingly, the time constant of the R. C. combination in the cathode circuit of the vertical sync clipper tube section 80 being tailored to the vertical sync signal recurrence frequency will establish the cathode 122 at a level corresponding to the black level 56a of the composite video signal to in turn establish conduction in the vertical sync clipper section 80 for only periods corresponding to vertical sync. It will be noted, however, that the characteristics of the two sync clipper sections as to noise immunity and signal fading are exactly opposite, that is to say, the time constant of the horizontal sync clipper section being very short is quite responsive to noise impulses while the time constant of the vertical sync clipper section being very long is relatively non-responsive to short noise pulses. Thus upon receiving a noise pulse, the horizontal sync clipping level will be disturbed to a greater extent than the vertical sync clipping level. Under the conditions of a drop in signal level due to fading or aircraft interference, the vulnerability of the two clipping circuits will be reversed, i e., the short time constant of the horizontal clipping section will allow the threshold to fluctuate more rapidly in accordance with signal strength thereby preserving a proper amount of clipped horizontal sync while the relatively long time constant of the vertical sync clipper circuit will not fluctuate as rapidly with signal strength reduction with the tendency to maintain the threshold of clipping above that necessary to clip all the vertical sync.

Therefore, in accordance with the present invention, means are provided for influencing the clipping threshold or vertical sync clipper with an integrated version of the horizontal clipping threshold information. In the case of the embodiment of Figure 1, this may be accomplished by placing a resistance 142 from the cathode 82 of the horizontal sync clipper to the cathode 122 of the vertical sync clipper. The value of the resistance 142 is adjusted in accordance with other circuit values and bias considerations to effect an optimum percentage of control of the vertical clipper threshold by the horizontal clipper threshold, the value being determined by the degree of compromise permissible between the above-described immunity against noise and immunity against signal fading for the vertical clipper section.

It will be clear that the time constant of the vertical sync clipper will necessarily be made smaller as more of the horizontal influence is desired. Furthermore, the capacitor 122 is preferably so proportioned relative to the resistance 142 that the vertical synchronizing signal necessarily appearing across the short time constant cathode load of the horizontal sync clipper tube section will be integrated so as to not produce degeneration of the clipped vertical sync across the cathode circuit of the vertical sync clipper. In operation with reduction in signal, the vertical sync clipper clipping threshold will be immediately influenced by a drop in potential of the horizontal sync clipper cathode 82 thereby causing the cathode 122 of the vertical sync clipper to drop to a suitable extent and produce an appropriate lowering of the vertical sync clipping threshold.

It is further manifest, as mentioned above, that the action of the AGC circuit will necessarily reduce the needed vertical clipper correction amount of control exercised by the horizontal threshold potential. This follows since in the event of a reduction in the amplitude of the incoming signal, the peak positive voltage attained by the cathode 82 of the horizontal sync clipper tube section will be correspondingly lower thereby reducing the average positive potential applied to the grid 104 of the D. C. amplifier 106. This will decrease the plate current through the amplifier 106 thereby causing both the I. F. and R. F. AGC terminals to become more positive and increase the gain of the television receiver amplifiers. This will then increase the amplitude of the demodulated signal 56 in the direction tending to make it the same amplitude as attained prior to the reduction of signal strength. As in all AGC systems, however, this correction will not be complete so that the actual amplitude of the signal applied to the control grid of the horizontal sync clipper will be less. With less signal and the reduced potential of the cathode 82, the vertical sync clipper threshold will be appropriately lower as above described to continue in its clipping to embrace virtually all of the vertical sync components. The threshold of the AGC action, however, may be controlled by adjusting the value of the control voltage applied to the D. C. amplifier grid 104, which control may be exercised by adjusting the potentiometer 102.

Although description of the present invention has been restricted to its particular embodiment in a television receiver, it is clear that it is in no way limited in its utility thereto. Furthermore, the potentials illustrated in the circuit representation are merely exemplary of those found feasible in practice and may assume numerous other values without departing from the spirit and scope of the present invention. Correspondingly, the utility of the present invention is further not limited to the actual employment of an AGC control provided either separately or derived from the horizontal sync clipper section as shown.

From the foregoing, it can be seen that the applicant has provided a simple, novel and inexpensive signal clipping arrangement particularly suited to television sync clipping circuits.

Having thus described my invention, what I claim is:

1. In electrical apparatus wherein high frequency and low frequency sync signals and intelligence signals are received as a composite signal in which the sync signals are of greater amplitude than the intelligence signals, the combination of, a first and second clipping circuit, each having a controllable clipping threshold permitting the passage through the clipping circuit of all signals above a predetermined amplitude established thereby, a first and second time constant circuit each having a time constant respectively comparable to the periods of the high and low frequency sync signals, means for applying the composite signal to the inputs of said clipping circuits and said time constant circuits, means for establishing primary control of the threshold of said first and second clipping circuits with the respective output voltage of said first and second time constant circuits, and means for applying a fraction of the time constant voltage developed by said first time constant circuit for secondarily influencing the threshold control of said second clipping circuit.

2. Apparatus according to claim 1 wherein the clipping threshold control influence of said first and second time constant circuits is so proportioned to maintain clipping of said first and second clipping circuits at levels below the sync signal amplitude but above the intelligence signal amplitude of said composite signal.

3. Apparatus according to claim 1 wherein said composite signal is of the television variety with said high frequency sync signals corresponding to the line sync of the television system and said low frequency sync signals corresponding to the frame sync of the television system.

4. Apparatus according to claim 1 wherein there is additionally provided a signal mixing circuit, means for directly applying the output of said first clipper circuit to the input of said mixer circuit, a low-pass circuit having its output connected with the input of the mixer, and connections for applying the output of said second clipper circuit to the input of said low-pass circuit.

5. In a television system wherein high line frequency and low frame frequency sync signals and image signals are received as a composite signal and wherein the sync signals are of greater amplitude than the image signals, a first and second variable threshold signal clipping circuits respectively designated as line and frame sync clippers, means for varying the clipping threshold on each of said clipping circuits in accordance with respective control signals, a first and second time constant circuit having respective time constants comparable to the line and frame sync signal periods, connections for applying composite signal to the inputs of said clipper circuits and said time constant circuits, means for developing a first clipper threshold control signal in accordance with the output of said first time constant circuit, means for developing a second clipper threshold control signal in accordance with the output of said second time constant circuit, and means for supplementing the threshold control signal applied to said second clipper with a fraction of the first clipper threshold control signal.

6. Apparatus according to claim 5 wherein said first and second clipping circuits respectively comprise electron discharge tubes having at least an anode and cathode and said first and second time constant circuits are respectively serially connected in the anode-cathode circuits of said discharge tubes.

7. Apparatus according to claim 6 wherein said means for supplementing the second clipper control signal comprises a galvanically conducting impedance connected between the anode-cathode circuits of said discharge tubes.

8. Apparatus according to claim 6 wherein said means for supplementing the second clipper control signal comprises galvanic conducting impedance connected between a point on said first time constant circuit to a point on said second time constant circuit.

9. In a television receiver having an automatic gain control circuit having an input terminal for receiving automatic gain control potential, said television receiver being adapted to receive and demodulate a composite video signal having line and frame frequency sync pulses of an amplitude in excess of corresponding image signals, a first and second variable threshold signal clipping circuits respectively designated as line and frame sync clippers, means for varying the clipping threshold of each of said clipping circuits in accordance with respective control signals, a first and second time constant circuit having respective time constants comparable to the line and frame sync signal periods, connections for applying composite signal to the inputs of said clipper circuits and said time constant circuits, means for developing a first clipper threshold control signal in accordance with the output of said first time constant circuit, means for developing a second clipper threshold control signal in accordance with the output of said second time constant circuit, means for supplementing the threshold control signal applied to said second clipper with a fraction of the first clipper threshold control signal, and an integrating circuit connected from said first time constant circuit to the input terminal of said AGC circuit.

10. In a television system wherein high line frequency and low-frame frequency sync signals and image signals are received as a composite signal in which the sync signals are of greater amplitude than the image signals, a first and second variable threshold signal clipping circuits respectively designated as line and frame sync clippers, means for varying the clipping threshold on each of said clipping circuits in accordance with a respective control signal, a first and second time constant circuit having respective time constants comparable to the line and frame sync signal periods, connections for applying component signal to the inputs of said clipper circuits and said time constant circuits, means for developing a first clipper threshold control signal in accordance with the output of said first time constant circuit, means for developing a second clipper threshold control signal in accordance with the output of said second time constant circuit, a signal integrating circuit having its input supplied with signals derived from said first time constant circuit, and means for supplementing the threshold signal applied to said second clipper with a portion of the signal developed at the output of said integrating circuit.

11. In a television receiver having an automatic gain control circuit and adapted to receive and demodulate high line frequency and low frame frequency sync signals and image signals received as a composite signal in which the sync signals are of greater amplitude than the image signals, a first and second variable threshold signal clipping circuits respectively designated as line and frame sync clippers, means for varying the clipping threshold on each of said clipping circuits in accordance with a respective control signal, a first and second time constant circuits having respective time constants comparable to but in excess of the line and frame sync signal periods, connections for applying demodulated composite signal to the inputs of said clipper circuits and said time constant circuits, means for developing a first clipper threshold control signal in accordance with the output of said first time constant circuit, means for developing a second clipper threshold control signal in accordance with the output of said second time constant circuit, means for supplementing the threshold control signal thereby applied to said second clipper with a fraction of the first clipper threshold control signal, integrating means connected with the output of said first time constant circuit for developing a fluctuating control voltage, and means for applying a version of said fluctuating control voltage as an automatic gain control for said receiver.

12. In a television receiver having automatic gain control circuit and adapted to receive and demodulate a composite signal having high line frequency and low frame frequency sync signals as well as image signals in which the sync signals are of greater amplitude than the image signals, a first and second discharge tube having at least an anode, cathode and control electrode, a first and second time constant circuits, having respective time constants comparable to but in excess of the line and frame sync signal periods, connections placing said first time constant circuit in the cathode circuit of said first discharge tube and said second time constant in the cathode circuit of said second discharge tube, means for applying demodulated composite signals to the control electrode of said first and second discharge tube, means for initially biasing said first and second discharge tube control electrodes so as to permit passage of anode-cathode current only on signal peaks corresponding to sync signals, and an integrating circuit connected between the cathode of said first discharge tube and the cathode of said second discharge tube.

13. Apparatus according to claim 12 wherein there is additionally provided an additional integrating circuit series with the control electrode of said second discharge tube.

14. Apparatus according to claim 12 wherein there is additionally provided a D. C. amplifier galvanic conducting integrating circuit connected from the input of said D. C. amplifier to the cathode of said first discharge tube and connections applying the output of said D. C. amplifier as a control potential to said television receiver automatic gain control circuit.

LUCIUS P. THOMAS, Jr.

No references cited.